UNITED STATES PATENT OFFICE.

THEODOR FLEITMANN, OF ISERLOHN, PRUSSIA, GERMANY.

METHOD OF PLATING IRON AND STEEL.

SPECIFICATION forming part of Letters Patent No. 242,194, dated May 31, 1881.

Application filed July 9, 1880. (No model.) Patented in Germany December 15, 1878.

*To all whom it may concern:*

Be it known that I, THEODOR FLEITMANN, of Iserlohn, Prussia, in the Empire of Germany, have invented a new and useful improvement in plating iron, steel, and copper, and their alloys, with nickel, cobalt, and their alloys, by welding, (for which I have received German Patent No. 7,569, for fifteen years, dated December 15, 1878,) of which the following is a specification.

This invention relates to plating nickel, cobalt, or their alloys, with copper, zinc, or iron, by welding to them sheets of iron or steel, or of the said metals or their alloys. For this purpose the contact-surface between the metal intended to constitute the body and that to serve as the plating metal must be filed, planed, or cleaned in such a manner that complete union becomes possible at all points. The two pieces are then exposed to the required welding-heat and are united by rolling or hammering, care being taken to exclude the air from contact with the surfaces to be welded together. The application of a welding compound, like borax, to the surfaces of contact is permissible; but it is not absolutely necessary.

A principal condition for uniting by welding is to exclude the air as completely as possible from the surfaces to be welded. The air may be excluded by various means—for instance, by enveloping the metals to be united in thin sheets of metal, exposing them to the proper heat, and then while so enveloped uniting them by hammering or rolling. The metal envelope becomes welded to the others, and is, after the welding has been completed and the mass has been partially rolled, removed from the plated article, either by dissolving or by some other means.

Thin sheet-iron is particularly well adapted as the wrapping-sheet, because it may be easily dissolved by dilute sulphuric acid or hydrochloric acid.

The air may also be excluded by using any other well-known method.

The process is suitable for manufacturing a great variety of articles of sheet metal or wire, which are capable of the most varied uses for industrial purposes. The copper-nickel alloy plated with nickel is preferable for certain industrial uses to sheet-iron plated with nickel, because cut edges of the copper-nickel alloy, when exposed, do not corrode like those of sheet-iron, and because, besides, no appreciable difference of color of the narrow cut edges exists.

My invention is also particularly useful for iron plated on one or both sides with a twenty-five per cent. copper and nickel alloy, also for a twenty-five per cent. copper and nickel alloy plated on one or both sides with nickel.

I claim—

1. The above-described process of uniting nickel, cobalt, or their alloys, with zinc, copper, or iron, by welding, the process consisting of uniting the cleaned surfaces by hammering or rolling at the requisite temperature, the air being excluded while welding, substantially as specified.

2. The process herein described of excluding air from metals to be welded together, by first enveloping the metals to be united in thin sheet metal, then welding the enveloped metals together, and finally removing the enveloping sheet metal, substantially as specified.

This specification signed by me this 2d day of June, 1880.

THEODOR FLEITMANN.

Witnesses:
   CARL T. BURRHARDT,
   MARKUS M. ROTTEN.